United States Patent
Kameyama et al.

(10) Patent No.: US 8,628,949 B2
(45) Date of Patent: Jan. 14, 2014

(54) APPARATUS FOR PRODUCING PROBE CARRIER

(75) Inventors: Makoto Kameyama, Chiba (JP);
Nobuyuki Okamura, Kanagawa (JP);
Tadashi Okamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 845 days.

(21) Appl. No.: 12/364,825

(22) Filed: Feb. 3, 2009

(65) Prior Publication Data

US 2009/0143251 A1    Jun. 4, 2009

Related U.S. Application Data

(62) Division of application No. 10/105,311, filed on Mar. 26, 2002, now abandoned.

(30) Foreign Application Priority Data

Mar. 28, 2001 (JP) ................................. 2001-094111
Mar. 28, 2001 (JP) ................................. 2001-094340

(51) Int. Cl.
*C12M 1/36*    (2006.01)

(52) U.S. Cl.
USPC ..................... 435/286.1; 435/287.2

(58) Field of Classification Search
None
See application file for complete search history.

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,723,129 A | 2/1988 | Endo et al. |
| 4,740,796 A | 4/1988 | Endo et al. |
| 4,929,963 A * | 5/1990 | Balazar ........................... 347/89 |
| 5,325,159 A | 6/1994 | Day |
| 5,424,186 A | 6/1995 | Fodor et al. |
| 5,807,522 A | 9/1998 | Brown et al. |
| 5,876,604 A * | 3/1999 | Nemser et al. ................ 210/634 |
| 5,958,342 A | 9/1999 | Gamble et al. |
| 6,063,339 A | 5/2000 | Tisone et al. |
| 6,110,426 A | 8/2000 | Shalon et al. |
| 6,221,653 B1 | 4/2001 | Caren et al. |
| 6,284,193 B1 * | 9/2001 | Carman et al. .................. 422/33 |
| 6,395,554 B1 * | 5/2002 | Regan et al. .................... 436/46 |
| 6,476,215 B1 | 11/2002 | Okamoto et al. |

(Continued)

FOREIGN PATENT DOCUMENTS

| | | |
|---|---|---|
| EP | 0 703 825 B1 | 7/1997 |
| EP | 0 895 082 A2 | 2/1999 |

(Continued)

*Primary Examiner* — Chris L Chin
(74) *Attorney, Agent, or Firm* — Fitzpatrick, Cella, Harper & Scinto (57) ABSTRACT

An apparatus for producing a probe carrier in which ambient humidity for a plurality of nozzles of a liquid ejection device for ejecting droplets of solutions containing probes to the surface of a carrier is controlled to 50% or more, preferably 60% or more. A part of solution supply passages to the plurality of nozzles is constructed from gas permeable membranes permitting gas-liquid separation under reduced pressure. These gas permeable membrane portions are gathered and altogether placed under reduced pressure to remove air bubbles from the respective solutions supplied to the plural nozzles and decrease the amount of a dissolved gas, which causes air bubbles to be generated.

11 Claims, 4 Drawing Sheets

(56) References Cited

U.S. PATENT DOCUMENTS

| | | |
|---|---|---|
| 6,544,796 B1 | 4/2003 | Eichenlaub et al. |
| 7,216,042 B2 | 5/2007 | Okamura et al. |
| 7,521,245 B1 * | 4/2009 | Osgood et al. ............... 436/49 |
| 2002/0051970 A1 * | 5/2002 | Perrin et al. .................. 435/6 |
| 2002/0051979 A1 * | 5/2002 | Chen et al. ................... 435/6 |
| 2002/0095073 A1 | 7/2002 | Jacobs et al. |
| 2002/0146815 A1 | 10/2002 | Watanabe et al. |
| 2002/0180475 A1 | 12/2002 | Watanabe et al. |
| 2004/0151628 A1 * | 8/2004 | Honkanen et al. ........... 422/63 |
| 2007/0160505 A1 | 7/2007 | Okamura et al. |

FOREIGN PATENT DOCUMENTS

| | | |
|---|---|---|
| JP | 59-123670 A | 7/1984 |
| JP | 59-138461 A | 8/1984 |
| JP | 11-187900 A | 7/1999 |
| WO | 95/35505 A1 | 12/1995 |

\* cited by examiner

APPARATUS FOR PRODUCING PROBE CARRIER

This application is a division of application Ser. No. 10/105,311, filed Mar. 26, 2002, which is based on Japanese Patent Application Nos. 2001-094340, filed Mar. 28, 2001, and 2001-094111, filed Mar. 28, 2001. All prior applications are incorporated herein by reference.

BACKGROUND OF THE INVENTION

1. Field of the Invention

This invention relates to a method and apparatus for producing a probe carrier. More specifically, the invention relates to a method and apparatus for producing a probe carrier which comprises probes fixed in a two-dimensional array arrangement onto a carrier.

2. Description of the Related Art

In analyzing the base sequence of gene DNA, or in making genetic diagnosis simultaneously for many items with high reliability, it is necessary to screen DNA having the desired base sequence with the use of plural types of probes. DNA microchips have attracted attention as means of providing the plural types of probes used in this screening procedure. High throughput screening or combinatorial chemistry for drugs, etc. also requires that many solutions of candidate proteins or drugs (for example, 96 types, 384 types or 1,536 types) be arranged, and subjected to orderly screening. For these purposes, methods for arranging many types of drugs, screening techniques automated in the arranged state, dedicated devices, and software for controlling a series of screening operations or processing the results statistically are under development.

These parallel screening operations basically use so-called probe carriers, each of which comprises many known probes, as screening means, arranged for a substance to be evaluated, thereby detecting the presence or absence of actions on or reactions with the probes under the same conditions. Generally, what actions on or reactions with probes should be utilized is determined beforehand. Thus, the probes loaded on one probe carrier belong to one type of substance, if classified roughly, such as a group of DNA probes with different base sequences. That is, substances utilized as one group of probes include, for example, DNA's, proteins, and synthetic chemicals (drugs). In many cases, a probe carrier comprising plural types of probes forming a group is used. Depending on the nature of the screening operation, an arrayed form in which DNA's having the same base sequence, proteins having the same amino acid sequence, or the same chemicals are arranged at many points may be used as probes. Such an array is used mainly for drug screening.

Specifically, a probe carrier comprising plural types of probes forming a group often takes a form in which plural types constituting a group of DNA's having different base sequences, a group of proteins having different amino acid sequences, or a group of different chemicals are arranged in an array on a carrier or the like according to a predetermined order of arrangement. Of these probe carriers, the DNA probe carrier is used in analyzing the base sequence of gene DNA or in conducting simultaneous, highly reliable genetic diagnosis of many items.

One of the problems with the probe carrier comprising plural types of probes forming a group is how to place as many types of probes as possible, e.g., DNA having many types of base sequences, on one carrier. In other words, the problem is how to arrange the probes in an arrayed form at a high density.

As one method for fixing plural types of probes in an arrayed form on a carrier, there can be named a method described in U.S. Pat. No. 5,424,186, the method for preparing DNA probes having different base sequences in an arrayed form by a sequential elongation reaction of DNA on a solid phase carrier with the use of photodegradable protective groups and photolithography. The use of this method makes it possible to produce, for example, a DNA probe carrier loaded with more than 10,000 types, per $cm^2$, of DNA's different in sequence. With this method, when DNA is to be synthesized by a sequential elongation reaction, a photolithography step is performed using dedicated photomasks for four types of bases (A, T, C, G) to elongate any of the bases selectively at a predetermined location in the array, thereby synthesizing plural types of DNA's having desired base sequences in a predetermined arrangement on a carrier. As a DNA strand lengthens, the costs and the amount of time associated with its production increase. In addition, the efficiency of nucleotide synthesis at each elongation stage is not 100%, so that the proportion of DNA's undergoing a deficiency in the designed base sequence is not low. Furthermore, the use of the photodegradable protective group during synthesis results in a low efficiency of synthesis, in comparison with the use of an ordinary acid-degradable protective group. Thus, an array obtained finally shows a low proportion of DNA's having the designed base sequences.

Moreover, the product directly synthesized on the solid phase carrier is used in an unchanged form. Thus, it is, of course, impossible to remove DNA having a defective base sequence from DNA's having the designed base sequences by purification and separation. Another possible problem is that the base sequences of DNA's synthesized on the carrier cannot be confirmed in the resulting array.

This problem means the following. Assume that a small elongation of a predetermined base takes place during a certain elongation stage, because of a mistake in the process or the like, leading to the appearance of a completely defective product. Screening using this defective probe carrier gives erroneous results, but this cannot at all be prevented. This inability to confirm the base sequence is a major and essential problem with the above-described method.

Another method proposed for producing a probe carrier comprises synthesizing and purifying DNA's for probes beforehand, confirming their base lengths if desired, and supplying the respective DNA's onto a carrier by a device such as a microdispenser. PCT International Patent Application Publication No. WO 95/35505 describes a method of supplying DNA's onto a membrane by use of a capillary. The application of this method, in principle, enables an array of about 1,000 DNA's/$cm^2$ to be produced. Basically, this method involves supplying a probe solution to a predetermined position on a carrier by a single capillary-shaped dispense device for each probe, and repeating this procedure, thereby producing a probe carrier. No problem is posed if dedicated capillaries are used for the respective probes. However, if a small number of capillaries is used to perform the same procedure, the capillaries need to be washed thoroughly in changing the types of the probes in order to prevent mutual contamination. The position of the supply should also be controlled for each procedure. Thus, the method is not said to be suitable for producing an array having many types of probes arranged at a high density. Besides, the supply of the probe solution to the carrier is carried out by tapping the front end of the capillary on the carrier. Thus, neither reproducibility nor reliability is complete.

As another method, a proposal has been made for a method in which when solid phase synthesis of DNA is performed on a carrier, a solution of a substance necessary for synthesis is supplied onto the carrier by the ink-jet method at each elongation stage. For example, European Patent Publication No. EP 0 703 825 B1 describes a method for solid phase synthesis of plural types of DNA's having predetermined base sequences by supplying nucleotide monomers and activators, which are utilized in solid phase synthesis of DNA, by different piezo jet nozzles. The supply (coating) by this ink-jet method, as contrasted with the supply (coating) of a solution using the capillary, is high in reliability, as seen from reproducibility of the amount of supply, and permits microfabrication of the structure of the nozzle. Thus, this method has features suitable for attaining a high density probe carrier. However, this method also basically utilizes a sequential elongation reaction of DNA on the carrier. Thus, it still has problems, such as the aforementioned major problem with the method described in U.S. Pat. No. 5,424,186, i.e., the base sequences of DNA's synthesized on the carrier cannot be confirmed. This method eliminates the tiresome procedure of performing a photolithography step using a dedicated mask at each elongation stage, but remains slightly problematic in terms of a requirement that the predetermined probes be fixed at respective points, which requirement is indispensable to the probe carrier. The aforementioned publication EP 0 703 825 B1 describes only a method using a plurality of individually formed piezo-jet nozzles. The method using the small number of the nozzles, like the aforementioned method using capillaries, is not necessarily suitable for producing a high density probe carrier.

Japanese Patent Application Laid-open No. 11-187900 (1999) discloses a method for forming spots containing probes on a solid phase by adhering liquids containing the probes, as droplets, to the solid phase by a thermal ink jet head. However, the ink jet head used is an ordinary printer head, and thus does not have an optimal structure for producing a probe carrier. Detailed reasons for this will be described below.

The conventional ink jet head was developed for printing characters or images. Thus, the solution used for it is ink of a single color (black) in the case of monochromatic (generally black) printing, or generally comprises inks of three primary colors, i.e., yellow (Y), cyan (C) and magenta (M), in the case of color printing. In color printing, variable density black or Y, M and C inks may be used where necessary, but more than ten types of inks, at most, are not used.

A large amount of ink is used for printing on a paper face. Thus, the conventional head for ink jet printing is equipped with a full capacity tank (reservoir) to be filled with ink, a channel for guiding the ink to a nozzle, and the nozzle for ejecting the ink.

A liquid ejection head for production of a probe carrier, on the other hand, is required to eject as many types of liquids as possible, as explained earlier. If the head has a plurality of nozzles, the head desirably has the same number of solution reservoirs as the number of the plural nozzles, the solution reservoirs corresponding one-to-one to the plurality of nozzles.

With a liquid ejection device for production of a probe carrier, moreover, the consumption of the liquid is small compared with printing on paper, so that the reservoir with a relatively small capacity is sufficient.

With the conventional ordinary head for ink jet printing, furthermore, desired ink needs to be ejected at a desired position on the paper face in order to form characters or images. Thus, the head is configured to be capable of selecting respective nozzles independently with arbitrary timing. Powered transistors and logical circuits, necessary for ejecting ink (liquid) from the desired nozzles, may be provided outside or inside the head.

Ink jet systems are classified into a thermal jet system for ejecting the liquid by thermal energy generated by a heater and a piezo-ink jet system for ejecting the liquid by deformation of a piezoelectric element caused when a voltage is applied to the piezoelectric element. Of these systems, the thermal jet system is simple in structure as compared with the piezo-ink jet system and is suitable for a downsized head and a multi-nozzle head.

As described above, the method of producing a probe carrier by means of a liquid ejection device is excellent in that minute amounts of probe solutions to be imparted are arranged at a high density on a solid phase carrier. The minimum amount of the liquid ejected at a time from an ejection orifice of the liquid ejection device can be decreased to the range of 0.1 pl to 50 pl. Even when many wells are placed on the carrier and minute amounts of the probe solutions are supplied into the respective wells, the sizes of the wells can be made small to achieve an even higher density.

SUMMARY OF THE INVENTION

Various advantages can be obtained by using the above-mentioned liquid ejection device in producing a probe carrier. However, new problems to be solved surface when a probe carrier producing method and apparatus using the liquid ejection device are put into practice.

To produce a relatively large scale probe array having not less than 1,000 types of solutions, the efficiency is better when spotting the solutions in a plurality of steps using a plurality of relatively small scale liquid ejection devices, than when performing the production in one step with the use of a single upsized liquid ejection device having an increased number of nozzles. Development of an apparatus preferred for use in such a case is necessary. In response to this need, the inventors of the present application propose a configuration employing a so-called single wafer processing device in which a transport means, such as a carrier transport robot, is provided at the center, and a plurality of probe imparting means are arranged around the transport means. In this case, a testing means and a drying means in charge of related steps are also arranged around the central transport means.

Not only the use of the single wafer processing device, but also the completion of all spotting procedure in one step poses a problem in that the first ejection of the solution may fail, or that subsequent ejection may also be impeded. When checking by the testing means shows the necessity for performing spotting again, the dots formed by the previous spotting are already dry. Such a problem becomes more striking particularly in the single wafer processing, in which the carrier must be transported from one means to another means.

The single wafer processing, as well as the one-step method, thus pose the common problem for which two causes are conceivable.

One of the causes is that a front end portion of the nozzle of the liquid ejection head is prone to dry, thereby increasing the viscosity of the solution in the nozzle, leading to unsuccessful ejection of the probe solution, or disordering the direction of ejection.

To produce the probe carrier means to use different types of solutions, use the corresponding number of nozzles, and impart desired probes accurately from the respective nozzles to many wells. This means that unlike the ink jet head for printing, the use frequency of each nozzle for ejection is extremely low; the head for printing can be capped to prevent drying of its nozzle front end portion during standby; whereas the liquid ejection head for production of a probe array cannot be capped for preventing drying of the nozzle front end portion, because some nozzles are always in use. This is one of the causes for the tendency toward drying of the nozzle front end portion of the liquid ejection head built into the probe carrier production apparatus.

The other cause for non-ejection is air bubbles that penetrate into or are generated in the probe solution. That is, air bubbles penetrate or are generated in the solution somewhere in a solution supply passage leading from the probe solution reservoir to the front end portion of each nozzle. When these air bubbles arrive at the front end of the nozzle, the solution is not present in the nozzle, resulting in non-ejection. In the absence of the solution in the nozzle, the interior of the nozzle at the front end thereof is directly exposed to the outside air. Thus, the front end portion of the nozzle is rapidly dried. If air bubbles are present in the solution within the nozzle, the air bubbles induce a drop in the ejection pressure, directly causing ejection failure.

Therefore, the first object of the present invention is to provide a method and an apparatus for producing a probe carrier, which can always prevent drying of a front end portion of a nozzle for ejection of a probe solution, and which does not inconvenience the ejection of the probe solution.

The second object of the present invention is to provide a single wafer processing apparatus capable of imparting a vast variety of probes efficiently onto a probe carrier.

To attain the foregoing objects, the present inventors conducted in-depth studies and obtained the following findings:

(i) If ambient humidity at the front end portion of the nozzle is maintained at not less than 50%, the drying of the nozzle front end portion over time can be prevented. The set humidity is preferably 60% or more. A specific structure for setting and maintaining such ambient humidity is preferably a structure in which the liquid ejection nozzle for imparting the probe solution onto the supported carrier is installed in an environment where humidity can be maintained at 50% or more, preferably 60% or more.

(ii) A part of solution supply passages between the plurality of probe solution reservoirs and the respective nozzles is constructed from hollow yarns comprising gas permeable membranes permitting gas-liquid separation under reduced pressure, hollow yarn portions of the supply passages are bundled, the bundled hollow yarn supply passage portions are passed into a vacuum chamber, and the exterior of the bundled hollow yarn supply passage portions is reduced in pressure. Thereby, the infiltrating air bubbles can be removed, and the amount of dissolved oxygen in the solution, which is the cause of air bubble generation, can be decreased efficiently.

The present invention has been accomplished based on the above findings.

A first apparatus for producing a probe carrier according to the present invention is an apparatus comprising: a support device for supporting a carrier; a liquid ejection head for imparting a plurality of solutions to predetermined positions on the carrier, the plurality of solutions containing plural types of probes capable of specifically binding to target substances; and a scan device for scanning the liquid ejection head relative to the support device, and wherein the liquid ejection head includes a plurality of reservoirs accommodating a plurality of probe solutions containing the plural types of probes specifically binding to the target substances, and a plurality of liquid ejection nozzles for receiving the supply of the probe solutions from the plurality of reservoirs and imparting droplets of the probe solutions onto the predetermined positions on the carrier, and at least the support device and the liquid ejection head are installed in an environment where humidity can be maintained at 50% or more.

In this apparatus, it is desired that a part of solution supply passages between the plurality of probe solution reservoirs and the respective nozzles is constructed from hollow yarns comprising gas permeable membranes permitting gas-liquid separation under reduced pressure, hollow yarn portions of the supply passages are bundled, and the bundled hollow yarn supply passage portions are passed into a vacuum chamber. According to this configuration, the exterior of the bundled hollow yarn supply passage portions can be reduced in pressure. As a result, air bubbles that can penetrate into the probe solutions supplied to the respective nozzles can be removed, and the amount of dissolved oxygen in the solution, which is the cause of air bubble generation, can be decreased efficiently.

A first method for producing a probe carrier according to the present invention is a method comprising:

scanning a liquid ejection head having a plurality of liquid ejection nozzles relative to a support device supporting a carrier thereon to impart a plurality of solutions to predetermined positions on the carrier, the plurality of solutions containing plural types of probes capable of specifically binding to target substances, thereby obtaining the probe carrier, wherein at least the support device and the liquid ejection head are installed in an environment where humidity can be maintained at 50% or more.

In this method, it is preferred that a part of solution supply passages between a plurality of probe solution reservoirs for supplying plural types of probe solutions to the plurality of nozzles of the liquid ejection head and the respective nozzles is constructed from hollow yarns comprising gas permeable membranes permitting gas-liquid separation under reduced pressure, hollow yarn portions of the supply passages are bundled, the bundled hollow yarn supply passage portions are passed into a vacuum chamber, and the exterior of the bundled hollow yarn supply passage portions is reduced in pressure, whereby air bubbles that can penetrate into the probe solutions supplied to the respective nozzles are removed, and the amount of dissolved oxygen in the solution, which is the cause of air bubble generation, is decreased efficiently.

By this method, no air bubbles are generated in the probe solution supplied, whereby a single wafer processing type method and apparatus for producing a probe carrier can be provided, in which no inconvenience occurs to the ejection of the probe solution even when the probe carriers continue to be produced.

A second apparatus for producing a probe carrier according to the present invention is an apparatus comprising: a plurality of probe imparting chambers each including a support device for supporting a carrier, a liquid ejection head for imparting plural types of probe solutions, capable of specifically binding to target substances, to predetermined positions on the carrier, and a scan device for scanning the liquid ejection head relative to the support device; and means for transporting the carrier, and wherein the other of the plurality of chambers are arranged around the transport means as the center, and the transport means transports the carrier for inserting and taking out the carrier into and from each of the chambers.

In the production apparatus of this constitution, it is desired that at least ambient humidity for the liquid ejection head constituting the plurality of probe imparting means is maintained at 50% or more.

In this apparatus, it is also desired that a part of solution supply passages between a plurality of probe solution reservoirs and respective nozzles of the liquid ejection head is constructed from hollow yarns comprising gas permeable membranes permitting gas-liquid separation under reduced pressure, hollow yarn portions of the supply passages are bundled, and the bundled hollow yarn supply passage portions are passed into a vacuum chamber. According to this configuration, the exterior of the bundled hollow yarn supply passage portions can be reduced in pressure. As a result, air bubbles infiltrating the probe solutions supplied to the respective nozzles can be removed, and the amount of dissolved oxygen in the solution, the cause of air bubble generation, can be decreased efficiently.

The present invention can provide a single wafer processing type method and apparatus for producing a probe carrier, in which when many probes are to be imparted on a carrier by the single wafer processing type apparatus separately in a plurality of steps, the drying of a front end portion of a nozzle for ejection of a probe solution can be always prevented, which is free from generation of air bubbles in the probe solution supplied, and in which solutions on dots on the carrier can be prevented from drying before completion of the impartment of all probes, whereby first ejection of the probe solution can be reliably induced in the production of the probe carrier having many types of solutions, in which ejection of the probe solution is not inconvenienced even when the probe carriers continue to be produced, and in which the dot-shaped solutions on the surface of the carrier before completion of probe impartment and during movement between the steps do not dry before all the impartment is completed.

A second method for producing a probe carrier according to the present invention is a method comprising: using an apparatus for producing a probe carrier comprising a plurality of probe imparting means each including a support device for supporting a carrier, a liquid ejection head for imparting plural types of probe solutions, capable of specifically binding to target substances, to predetermined positions on the carrier, and a scan device for scanning the liquid ejection head relative to the support device, testing means for testing a probe impartment state on a surface of the carrier, and means for transporting the carrier, and wherein other chambers are arranged around the transport means as the center; supporting the carrier on the support device in each of the probe imparting means; using the liquid ejection head having a plurality of liquid ejection nozzles; and scanning the liquid ejection head relative to the support device to impart the plural types of probe solutions to predetermined positions on the carrier, thereby obtaining the probe carrier.

In the production method of this constitution, it is desired that at least ambient humidity for the liquid ejection head constituting the plurality of probe imparting means is maintained at 50% or more, whereby the drying of front end portion of the liquid ejection nozzle is alleviated to prevent a failure in the ejection of the nozzles, and even if testing of the carrier during processing before completion of probe impartment shows the necessity for a correction, the drying of the carrier surface in the course of the process is prevented to make the correction possible.

In this method, it is also preferred to construct a part of solution supply passages, which extend between a plurality of probe solution reservoirs for supplying plural types of probe solutions to the plurality of nozzles of the liquid ejection head and the respective nozzles, from hollow yarns comprising gas permeable membranes permitting gas-liquid separation under reduced pressure, bundle hollow yarn portions of the supply passages, pass the bundled hollow yarn supply passage portions into a vacuum chamber, and bring the exterior of the bundled hollow yarn supply passage portions to a reduced pressure, thereby removing air bubbles in the probe solutions supplied to the respective nozzles, and efficiently decreasing the amount of dissolved oxygen in the solution, which is the cause of air bubble generation.

The above and other objects, effects, features and advantages of the present invention will become more apparent from the following description of embodiments thereof taken in conjunction with the accompanying drawings.

DETAILED DESCRIPTION OF PREFERRED EMBODIMENTS

In the present invention having the aforementioned features, ambient humidity for the liquid ejection head constituting the plurality of probe imparting means or set humidity within an environment control chamber is at least 50%, and preferably 60% or more.

The liquid ejection device is desirably a device equipped with a thermal energy generator, which provides thermal energy to the liquid in the nozzle for the ejection.

Suitable as the probe is any one of DNA, RNA, cDNA (complementary DNA), PNA, oligonucleotide, polynucleotide, other nucleic acid, oligopeptide, polypeptide, protein, enzyme, substrate for enzyme, antibody, epitope for antibody, antigen, hormone, hormone receptor, ligand, ligand receptor, oligosaccharide, and polysaccharide.

Embodiment 1

Figure 1:
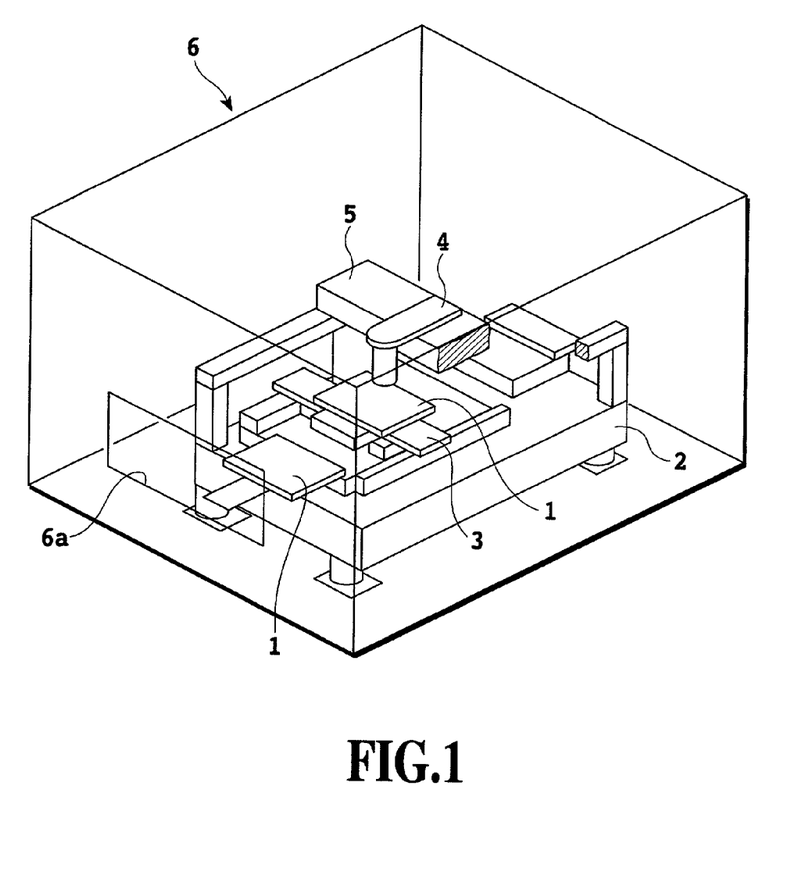
FIG. 1 is a schematic perspective view showing an embodiment of a first apparatus for producing a probe carrier according to the present invention.

FIG. 1 shows an embodiment of the present invention, in which numeral 1 denotes a carrier of probes. The carrier 1 is fixed onto a support device 3 of a probe imparting device (means) 2, generally called an imaging device, so as to be spotted with probes. The support device 3 may be stationary or may be horizontally scannable in order to change the position where the probes are imparted.

Directly above the support device 3, a liquid ejection head (liquid ejection device) 4 having a plurality of nozzles (not shown) for ejecting a plurality of probe solutions is provided so as to be vertically movable and horizontally scannable. The vertical movement and horizontal scanning of the liquid ejection head 4 are carried out by a scan device 5.

Liquid ejection nozzles, whose number corresponds to the number of probes of plural types necessary for imparting probes, are formed in the liquid ejection head 4. Each of the nozzles is supplied with a solution containing the probe to be imparted, from a probe solution reservoir (not shown) via a liquid channel. Normally, each nozzle corresponds to one dot to be imparted onto the surface of the carrier 1. The nozzles, solution supply passages, and reservoirs are present in numbers corresponding to the number of the dots.

A liquid ejection head of a thermal jet type, in which ejection heaters are provided in the respective nozzles, is used as the liquid ejection head of the present embodiment.

The probe imparting device 2 is composed of, at least, the aforementioned support device 3, liquid ejection head 4, and scan device 5. The entire device 2 is installed within an environment control chamber 6. The environment control chamber 6 has the function of maintaining the humidity inside the chamber at a constant high humidity level of 50% or more. In the present embodiment, the humidity is always set at 60%.

Figure 2:
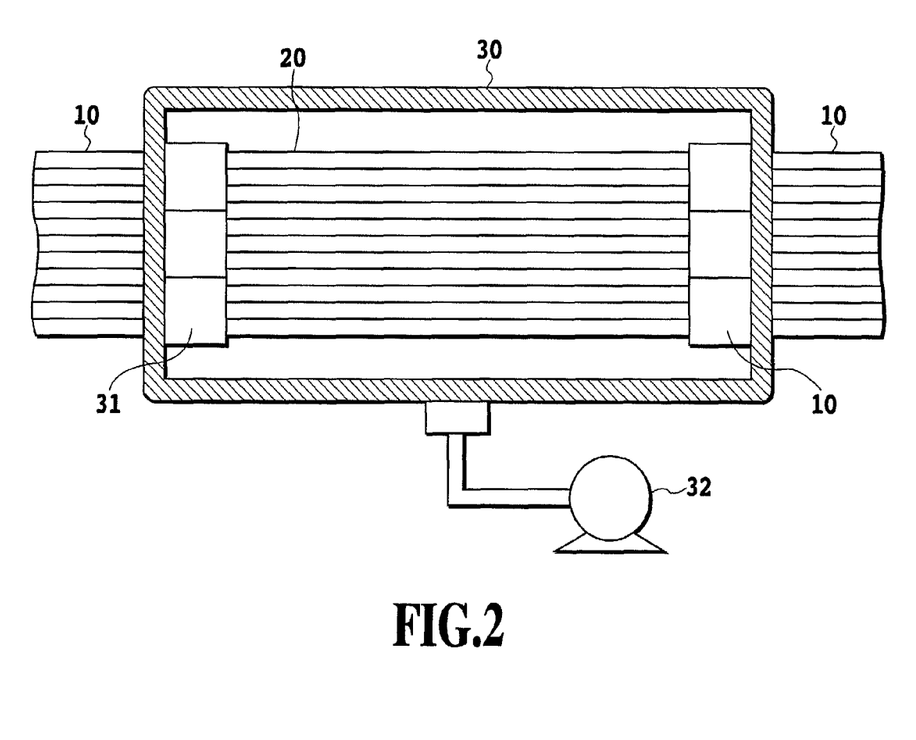
FIG. 2 is a sectional configuration drawing of a vacuum degasification chamber, an essential part of the probe carrier production apparatus according to the present invention.

The aforementioned plural solution supply passages are usually composed of thin tube members 10, called hollow yarns, as shown in FIG. 2. In the present embodiment, a part of many hollow yarns 10, which are the solution supply passages, is constructed of gas permeable membranes permitting gas-liquid separation under reduced pressure. Hollow yarns 20 comprising the gas permeable membranes are tied in a bundle, and the bundled portions are placed inside a vacuum degasification chamber 30. That is, the vacuum degasification chamber 30 is mounted such that the bundled solution supply passages (hollow yarns) 10 pierce through the chamber 30 and the portions 20 comprising the gas permeable membranes among the hollow yarns are located within the vacuum degasification chamber 30. On the side walls of the chamber 30, through which the hollow yarns pass, sealing 31 with molten resin is applied to ensure high air tightness. Degasification of the chamber 30 is performed by a vacuum pump 32 provided outside.

The probe carrier production apparatus structured as above was used to impart many types of probe solutions onto the carrier 1, thereby preparing a probe carrier. First, the carrier 1 was carried from the outside into the environment control chamber 6 via a carrier carry-in/carry-out gate 6a of the chamber 6 and was fixed onto the support device 3. Then, the gate 6a was immediately shut so that the humidity inside the chamber would not be disturbed. Then, the liquid ejection head 4 was scanned and driven according to a probe imparting program entered in the scan device 5 to complete a predetermined imparting operation. During the probe imparting operation, the interior of the aforementioned vacuum degasification chamber 30 was maintained at a predetermined degree of vacuum and its degasification was continued.

The carrier 1, whose probe impartment was completed, was taken out of the gate 6a, brought into a testing chamber (not shown), and observed for dots of the probe solutions adhering to the surface of the carrier 1. As a result, dropouts due to non-ejection from the nozzles or deformed dots were not observed. Then, probe impartment was performed sequentially for a plurality of carriers, but neither dropouts of dots nor deformation of dots was observed in any of the carriers.

With such a series of imparting operations, one nozzle corresponds to one dot. Thus, if the imparting operations last for a relatively long time, the front end portions of the nozzles are exposed to the atmosphere in a wait state over such a lengthy period of time. Nevertheless, no abnormalities occurred in the imparted dots, as stated above. This is because a high humidity atmosphere was maintained around the nozzles, and the front end portions of the nozzles did not dry. Another reason is that air bubbles were removed from the probe solutions supplied to the nozzles. It has been found that the amount of dissolved oxygen in the probe solution can be decreased to at least 5 ppm (normally 0.5 ppm) or less by a continuous run of the vacuum degasification chamber 30. The decrease in the amount of dissolved oxygen prevents the occurrence of air bubbles in the solution after passage through the chamber 30.

In the present embodiment, the environmental humidity was set at 60%, while it was set at 50% in other embodiments. Although slight decreases in the yield tended to be observed in comparison with the humidity of 60%, the performance of the resulting probe carriers was sufficient, showing the production to be fully reliable.

When the environmental humidity was set below 50%, it had a tendency to reduce the yield in proportion to lowering of the humidity, and deficiency in performance was observed in the produced probe carriers.

Embodiment 2

Figure 3:
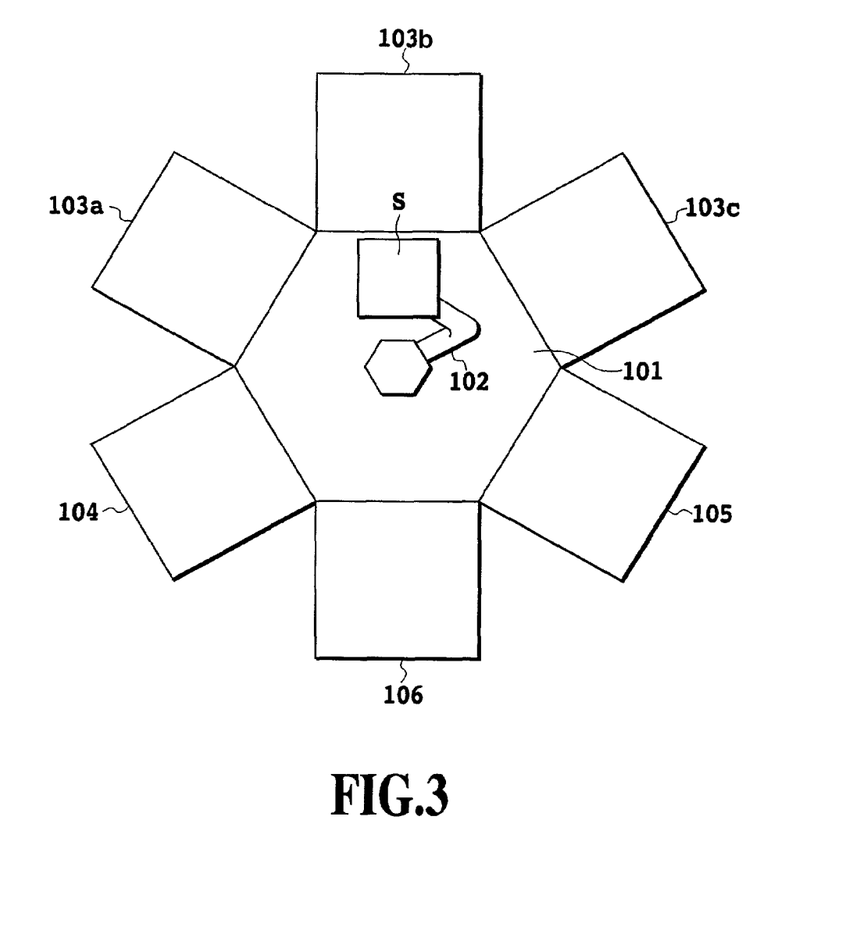
FIG. 3 is a schematic configurational plan view showing an embodiment of a single wafer processing type probe carrier production apparatus, a second apparatus for producing a probe carrier according to the present invention.

FIG. 3 shows a second embodiment of the present invention, and is a schematic configurational plan view of a probe carrier production apparatus according to the present invention. In the drawing, numeral 101 denotes a transport chamber provided with a transport robot (transport means) 102 for transporting a carrier (solid-phase substrate) S. A plurality of probe imparting means (chambers) 103a, 103b and 103c, testing means (chamber) 104, drying means (chamber) 105, and an in-and-out chamber 106 for bringing the carrier S into and out of the transport chamber 101 are arranged around the transport chamber 101, which is used as a center. A carrier carry-in/carry-out gate is provided between each of the chambers and the central transport chamber 101.

Figure 4:
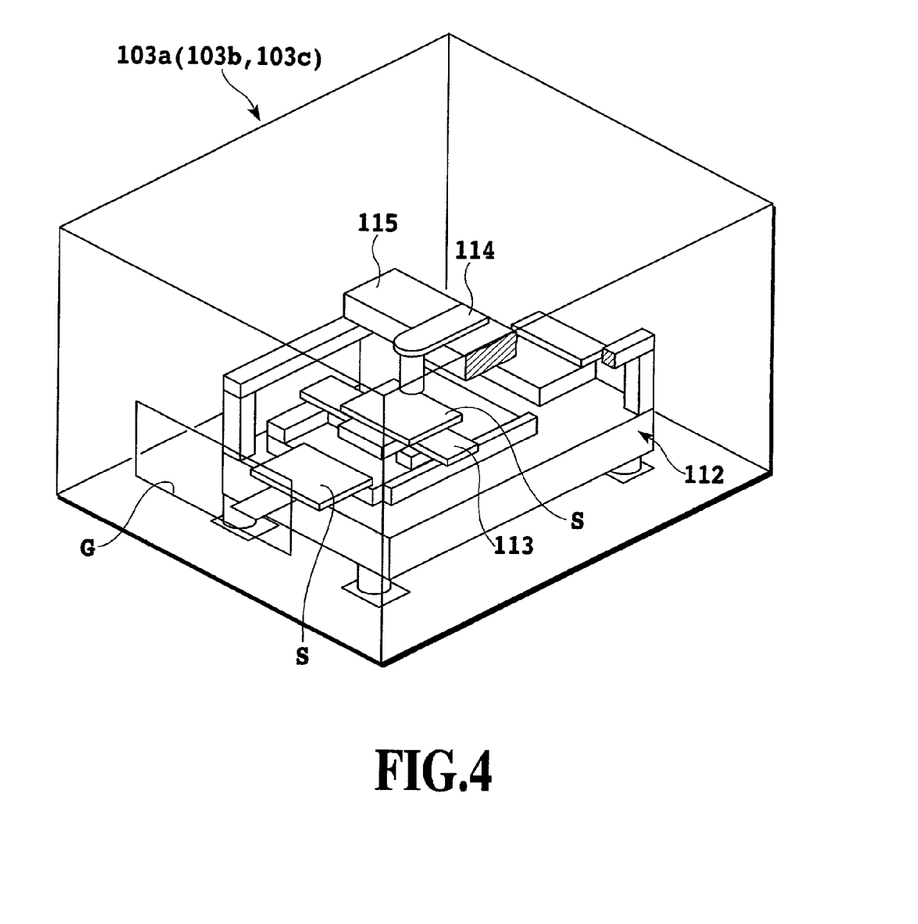
FIG. 4 is a schematic perspective view of a probe imparting chamber constituting the single wafer processing type probe carrier production apparatus according to the present invention.

The probe imparting chambers 103a, 103b and 103c each have a structure as shown in FIG. 4. In the apparatus shown in FIG. 4, the carrier S is supported on a support device 113 of a device 112, generally called an imaging device, so as to undergo the impartment of probes. The support device 113 may be stationary, or may be horizontally scannable in order to change the position of imparting the probes.

Directly above the support device 113, a liquid ejection head (liquid ejection device) 114 having a plurality of nozzles (not shown) for ejecting a plurality of probe solutions is provided so as to be vertically movable and horizontally scannable. The vertical movement and horizontal scanning of the liquid ejection head 114 are carried out by a scan device 115.

Liquid ejection nozzles, which are present in a number allocated to each of the chambers and corresponding to the number of probes of plural types necessary for imparting probes, are formed in the liquid ejection head 114. Each of the nozzles is supplied with a solution, which contains the probe and takes charge of probe impartment, from a probe solution reservoir (not shown) via a liquid channel. Normally, each nozzle corresponds to one dot to be imparted onto the surface of the carrier S. The nozzles, solution supply passages, and reservoirs are present in numbers corresponding to the number of the dots.

A liquid ejection head of a thermal jet type, in which ejection heaters are provided in the respective nozzles, is used as the liquid ejection head of the present embodiment.

The imaging device 112 is composed of, at least, the aforementioned support device 113, liquid ejection head 114, and scan device 115. The entire device 112 is installed within each of the chambers 103a, 103b and 103c. These chambers 103a, 103b and 103c have the function of maintaining the humidity inside the chamber at a constant high humidity level of 50% or more. In the present embodiment, the humidity was always set at 60%. In the present invention, like the plurality of probe imparting chambers 103a, 103b and 103c, the testing chamber 104 and the transport chamber 101 are also set to have the same humidity.

The aforementioned plural solution supply passages have the same structure as used in the apparatus of Embodiment 1. Each of the solution supply passages is usually composed of thin tube members 10, called hollow yarns, as shown in FIG. 2. In the present embodiment, part of many hollow yarns 10, which are the solution supply passages, is constructed of gas permeable membranes permitting gas-liquid separation under reduced pressure. The hollow yarns 20 comprising the gas permeable membranes are tied in a bundle, and the bundled portions are placed inside a vacuum degasification chamber 30. That is, the chamber 30 is mounted such that the bundled solution supply passages (hollow yarns) 10 pierce through the chamber 30 and the portions 20 comprising the gas permeable membranes among the hollow yarns are located within the vacuum degasification chamber 30. On the side walls of the chamber 30, through which the hollow yarns pass, sealing 31 with molten resin is applied to ensure high air tightness. Degasification of the chamber 30 is performed by a vacuum pump 32 provided outside.

The probe carrier production apparatus structured as above was used to impart many types of probe solutions onto the carrier S, thereby preparing a probe carrier. First, the carrier S was carried from the transport chamber 101 into the chamber 103a via a carrier carry-in/carry-out gate G of the chamber 103a, and the carrier S was supported on the support device 113. After the gate G was shut, the liquid ejection head 114 was scanned and driven according to a probe imparting program entered in the scan device 115 to complete a predetermined imparting operation. During the imparting operation, the interior of the aforementioned vacuum degasification chamber 30 was maintained at a predetermined degree of vacuum, and its degasification was continued. In this first chamber 103a, 363 dots were formed on the carrier S, followed by formation of 363 dots in the next chamber 103b and 363 dots further in the next chamber in the same manner, whereby a total of 1,089 dots were formed on the carrier S.

The carrier S, whose probe impartment was completed, was taken out of the gate G of the chamber 103c by the transport robot 102 and brought into the testing chamber 104, where the dots of the solutions adhering to the surface of the carrier S were observed. As a result, dot dropouts due to non-ejection from the nozzles or deformed dots were not observed. Then, probe impartment was performed sequentially for a plurality of carriers, but neither dropouts of dots nor deformation of dots was observed in any of the carriers.

In another trial run, whenever probe impartment in each of the chambers 103a, 103b and 103c was completed, the carrier S was carried into the testing chamber 104, and the surface of the carrier was tested. After each operation, drying of the carrier surface was not observed.

With such a series of spotting operations, one nozzle corresponds to one dot. Thus, if the probe imparting operations last for a relatively long time, the front end portions of the nozzles are exposed to the atmosphere in a wait state over such a lengthy period time. Nevertheless, no abnormalities occurred in the imparted dots, as stated above. This is because the atmosphere surrounding the nozzles was maintained at a high humidity at which the front end portions of the nozzles did not dry. Another reason is that air bubbles were removed from the probe solutions supplied to the nozzles. It has been found that the amount of dissolved oxygen in the probe solution can be decreased to at least 5 ppm (normally 0.5 ppm) or less by a continuous run of the vacuum degasification chamber 30. The decrease in the amount of dissolved oxygen prevents air bubbles from forming in the solution after passage through the chamber 30.

In the present embodiment, the environmental humidity was set at 60%, while it was set at 50% in other embodiments. Although slight decreases in yield tended to be observed in comparison with the humidity of 60%, the performance of the resulting probe carriers was sufficient, showing the productions to be fully reliable.

When the environmental humidity was set below 50%, it had a tendency to reduce the yield in proportion to lowering of the humidity, and deficiency in performance was observed in the produced probe carriers.

In the present embodiment, the transport means, the probe imparting means, and the testing means were constituted as chambers, which were isolated from each other. However, they may be installed in a single space without being isolated. In this case, the entire ambient humidity may be controlled in a centralized manner. Moreover, it is not necessary to control the humidity of the entire space or to control the ambient humidity of each chamber. It is sufficient to maintain the surrounding atmosphere for the liquid ejection head at a predetermined high humidity level. Thus, it is permissible, for example, to cover the liquid ejection head with a small-space chamber having an opening/closing window for a probe imparting operation, and to perform humidity control of only the surrounding atmosphere for the liquid ejection head.

Herein, the probe fixed onto the carrier (solid phase substrate) can specifically bind to a particular target substance. The probe includes an oligonucleotide, a polynucleotide, or another polymer, which can be recognized by a particular target. The term "probe" refers to a molecule having a probe function, such as an individual polynucleotide molecule, or a group of molecules having the same probe function, such as polynucleotides of the same sequence surface fixed at dispersed positions, and often includes molecules called ligands. The probe and the target are often used in a replaceable manner, and the probe can bind, as part of a ligand-anti-ligand antibody (may be called a receptor) pair, to the target, or can become a form binding to it. The probe and the target herein can include bases, which can be found in nature or matter similar thereto.

An example of the probe supported on the carrier is one which has a site of binding to the carrier via a linker in a part of an oligonucleotide comprising a base sequence hybridizable to a target nucleic acid, and which has a structure connected to the surface of the carrier at the site of binding to the carrier. The probe is, preferably, a single-strand nucleic acid having a complementary base sequence to all or a part of the target nucleic acid. The probe can be hybridized specifically with the target substance. The location, in the molecule of the oligonucleotide, of the site of binding to the carrier in this configuration is not limited as long as the desired hybridization reaction is not impaired.

The probe employed in the probe carrier, to which the method of the present invention is applied, is properly selected according to the purpose of its use. For preferred practice of the method of the present invention, the two-dimensional probe carrier to be produced has the probe, which is preferably at least one of DNA's, RNA's, cDNA's (complementary DNA's), PNA's, oligonucleotides, polynucleotides, other nucleic acids, oligopeptides, polypeptides, proteins, enzymes, substrates for enzymes, antibodies, epitopes for antibodies, antigens, hormones, hormone receptors, ligands, ligand receptors, oligosaccharides, and polysaccharides.

The probe carrier produced by the method of the present invention preferably includes a probe having a structure capable of binding to the surface of a carrier. Fixing of the probe onto the carrier is desirably performed by binding the probe to the surface of the carrier.

The structure capable of binding to the carrier surface, which the probe has, is preferably one that has been formed by a treatment for introducing previously to a molecule of a probe material at least one of organic functional groups, such as an amino group, a mercapto group, a carboxyl group, a hydroxyl group, an acid halide (a haloformyl group: —COX), a halide (—X), an aziridine group, a maleimide group, a succinimide group, an isothiocyanate group, a sulfonyl chloride (—SO$_2$Cl) group, an aldehyde group (formyl group: —CHO), hydrazine, and an iodinated acetamide. In this case, it is necessary previously to force onto the surface of the substrate a structure (an organic functional group), which reacts with each of various types of the above mentioned organic functional groups to form covalent bonding. For example, when the probe material has an amino group, a succinimide ester, an isothiocyanate, a sulfonylchloride and an aldehyde can be placed onto the surface of the substrate. When the probe material has a mercapto group (thiol group), a maleimide can be placed onto the surface of the substrate. When a glass material is used as the substrate, a required functional group can be placed onto the surface of the substrate by using a silane coupling agent having the required functional group, and additionally a cross-linker having the required functional group.

When the probe solution imparted on the carrier is dried drastically, the probe cannot be fixed sufficiently onto the carrier. In order to prevent this problem, it is preferable to control not only the environmental humidity of the liquid ejection portion, but also that of a path for transporting the carrier. In addition, it is preferable to determine the time needed for the probe to be fixed sufficiently onto the carrier, to set up the time to expose the probe carrier to the environmental humidity according to the determined time, and, after the set time passed, to take out the probe carrier from the environmental humidity.

The present invention achieves distinct effects when applied to a recording head or a recording apparatus which has means for generating thermal energy, such as electrothermal transducers or laser light, and which causes changes in ink by the thermal energy so as to eject ink. This is because such a system can achieve a high density of probe placement and lead to a high-resolution probe carrier.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces a sudden temperature increase that exceeds the nucleate boiling point so as to cause film boiling upon heating portions of the recording head; and third, bubbles are formed in the liquid (ink) corresponding to the drive signals. By using the growth and collapse of the bubbles, the ink is expelled from at least one of the ink ejection orifices of the head to form one or more ink drops. The drive signal in the form of a pulse is preferable, because the growth and collapse of the bubbles can be achieved instantaneously and suitably by this form of a drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention. This structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve probe imparting positively and effectively.

The present invention can be also applied to a so-called full-line type liquid ejecting head whose length equals the maximum length across a probe carrier. Such a recording head may consists of a plurality of recording heads combined together or of one integrally arranged recording head.

In addition, the present invention can be applied to various serial type liquid ejecting heads: a liquid ejecting head fixed to the main assembly of a liquid ejecting apparatus; a conveniently replaceable chip type liquid ejecting head, which, when loaded on the main assembly of a liquid ejecting apparatus, is electrically connected to the main assembly and is supplied with probe solution therefrom; and a cartridge type liquid ejecting head integrally including a probe solution reservoir.

It is further preferable to add a recovery system or a preliminary auxiliary system for a liquid ejecting head as a constituent of the liquid ejecting apparatus, because they serve to make the present invention more reliable. Examples of the recovery system are a capping means and a cleaning means for the liquid ejecting head, and a pressure or suction means for the liquid ejecting head. Examples of the preliminary auxiliary system are a preliminary heating means utilizing electrothermal transducers or a combination of other heater elements and the electrothermal transducers, and a means for carrying out a preliminary ejection of a probe solution independently of the ejection for probe imparting. These systems are effective for reliable ejection of liquid.

The most effective method for the above-described solution is to carry out film boiling stated above.

As described above, the present invention is characterized in that ambient humidity for the plurality of nozzles of the liquid ejection device for ejecting droplets of solutions containing probes to the surface of the carrier is controlled to 50% or more, preferably 60% or more, a part of the solution supply passages leading to the plurality of nozzles is composed of gas permeable membranes capable of gas-liquid separation under reduced pressure, and these portions are gathered and altogether placed under reduced pressure, whereby air bubbles are removed from the solutions supplied to the plurality of nozzles, and the amount of a dissolved gas, a cause of air bubble formation, is decreased.

Accordingly, the present invention makes it possible to produce a high quality probe carrier at a high yield.

The present invention has been described in detail with respect to the preferred embodiments, but it is to be understood that changes and modifications may be made without departing from the invention in its broader aspects, and it is our intention in the appended claims to cover all such changes and modifications that fall within the true spirit of the invention.

What is claimed is:

1. An apparatus for producing a probe carrier comprising:
a plurality of chambers, including at least a probe imparting chamber, the probe imparting chamber comprising:
a support device for supporting a carrier;
a liquid ejection head for imparting a plurality of solutions to predetermined positions on the carrier, the plurality of solutions containing probes capable of specifically binding to target substances;
a scan device for scanning the liquid ejection head relative to the support device; and
a chamber for maintaining an environment containing the liquid ejection head at a humidity of 60% or more,
wherein the liquid ejection head comprises a plurality of reservoirs and a plurality of liquid ejection nozzles,
wherein the plurality of reservoirs accommodate a plurality of probe solutions containing probes specifically binding to the target substances,
wherein the plurality of liquid ejection nozzles are those for receiving a supply of the probe solutions from the plurality of reservoirs and imparting droplets of the probe solutions onto the predetermined positions on the carrier,
wherein at least the support device and the liquid ejection head are installed in the environment where the humidity can be maintained at 60% or more before imparting the droplets of the probe solutions and the humidity is maintained at 60% or more while imparting the droplets,
wherein the chamber has an opening for inserting the carrier into the chamber, and
wherein the chamber covers a region where the liquid ejection head and the scan device are moved; and
means for transporting the carrier,
wherein the chambers are arranged around the transport means, and wherein the transport means transports the carrier for insertion into and removal from the chambers.

2. The apparatus according to claim 1, further comprising a testing chamber for testing a probe impartment state on a surface of the carrier.

3. The apparatus according to claim 1, wherein part of solution supply passages between the plurality of probe solution reservoirs and their respective said nozzles are constructed from hollow tube members, parts of the hollow tube members are made of gas permeable members permitting gas-liquid separation under reduced pressure, and the hollow tube members are passed into a vacuum chamber.

4. The apparatus according to claim 1, wherein the liquid ejection head is equipped with a thermal energy generator that provides thermal energy to a liquid in the nozzle in order to eject the liquid.

5. The apparatus according to claim 1, wherein the liquid ejection head is equipped with a thermal energy generator that provides thermal energy to a liquid in the nozzle to eject the liquid.

6. The apparatus according to claim 1, wherein the probe is a nucleic acid, an oligopeptide, a polypeptide, a protein, an enzyme, a substrate for enzyme, an antibody, an epitope for antibody, an antigen, a hormone, a hormone receptor, a ligand, a ligand receptor, an oligosaccharide, or a polysaccharide.

7. The apparatus according to claim 6, wherein the nucleic acid is DNA, RNA, cDNA (complementary DNA), PNA, an oligonucleotide, or a polynucleotide.

8. The apparatus according to claim 1, wherein the chamber has a gate in the opening, the gate being able to open and close.

9. The apparatus according to claim 1, wherein the droplets are fine droplets having a range of 0.1 pl to 50 pl.

10. The apparatus according to claim 1, wherein means for transporting the carrier is contained in the transport chamber and the transport chamber is maintained at the humidity of 60% or more, and for fixing the probe during the carrier transport by the transport means, an atmosphere around the transport means is also maintained at the humidity of 60% or more in the environment.

11. An apparatus for producing a probe carrier comprising:
a probe imparting chamber, the probe imparting chamber comprising:
a support device for supporting a carrier;
a liquid ejection head for imparting a plurality of solutions to predetermined positions on the carrier, the plurality of solutions containing probes capable of specifically binding to target substances;
wherein the liquid ejection head comprises a plurality of reservoirs and a plurality of liquid ejection nozzles,
wherein the plurality of reservoirs accommodate a plurality of probe solutions containing probes specifically binding to the target substances,
wherein the plurality of liquid ejection nozzles are those for receiving a supply of the probe solutions from the plurality of reservoirs and imparting droplets of the probe solutions onto the predetermined positions on the carrier,
wherein at least the support device and the liquid ejection head are installed in the environment where the humidity can be maintained at 60% or more before imparting the droplets of the probe solutions and the humidity is maintained at 60% or more while imparting the droplets,
wherein the chamber covers a region where the liquid ejection head and the scan device are moved, and
wherein the chamber has an opening for inserting the carrier into the chamber; and
means for transporting the carrier, the means being contained in the transport chamber, and the transport chamber being maintained at the humidity of 60% or more,
wherein the transport means transports the carrier for insertion into and removal from the chambers, and
wherein, for fixing the probe during the carrier transport by the transport means, atmosphere around the transport means is also maintained at the humidity of 60% or more in the environment.

* * * * *